US008668065B2

(12) United States Patent
Kämpf et al.

(10) Patent No.: US 8,668,065 B2
(45) Date of Patent: Mar. 11, 2014

(54) TORQUE LIMITING COUPLING

(75) Inventors: Klaus Kämpf, Lohmar (DE); Bernd Carstensen, Ruppichteroth (DE)

(73) Assignee: GKN Walterscheid GmbH, Lohmar (DE)

( * ) Notice: Subject to any disclaimer, the term of this patent is extended or adjusted under 35 U.S.C. 154(b) by 282 days.

(21) Appl. No.: 12/854,991

(22) Filed: Aug. 12, 2010

(65) Prior Publication Data
US 2011/0036679 A1  Feb. 17, 2011

(30) Foreign Application Priority Data

Aug. 13, 2009 (DE) .......................... 10 2009 037 026

(51) Int. Cl.
*B60W 10/02* (2006.01)
*B60W 10/18* (2012.01)
*D05B 69/12* (2006.01)

(52) U.S. Cl.
USPC ...................................... 192/12 B; 192/17 R

(58) Field of Classification Search
USPC .............................................. 192/12 B, 17 R
See application file for complete search history.

(56) References Cited

U.S. PATENT DOCUMENTS

| 4,460,077 | A | | 7/1984 | Geisthoff |
| 4,629,044 | A | * | 12/1986 | Post et al. ...................... 192/28 |
| 6,749,049 | B2 | * | 6/2004 | Kampf et al. ................... 192/15 |
| 6,799,666 | B2 | | 10/2004 | Kampf |
| 2009/0093316 | A1 | | 4/2009 | Kampf |

FOREIGN PATENT DOCUMENTS

| DE | 30 34 606 | 3/1982 |
| DE | 102 01 988 | 12/2003 |
| DE | 10 2007 047 635 | 4/2009 |
| DE | 10 2007 057 865 | 6/2009 |

\* cited by examiner

*Primary Examiner* — David D Le
*Assistant Examiner* — Colby M Hansen
(74) *Attorney, Agent, or Firm* — Harness, Dickey & Pierce, P.L.C.

(57) ABSTRACT

A torque limiting coupling rotatably arranged around a longitudinal axis A has a coupling hub (2, 102, 202), drivers (6, 106), a coupling sleeve (3, 103, 203) and a switching disk (4, 104, 204). The switching disk (4, 104, 204) is rotatably arranged between a switched-on position and an idling position relative to the coupling hub (2, 102, 202). The drivers (6, 106) engage the coupling sleeve first recesses (7, 107, 207) in the switched-on position. The drivers (6, 106) engage the switching disk second recesses (8, 108, 208) in the idling position. A first spring mechanism (25, 125, 225) urges the switching disk (4, 104, 204) in the direction towards the switched-on position. A second spring mechanism (12, 112, 212) acts axially on the switching disk (4, 104, 204) and urges the drivers (6, 106) against the coupling sleeve (3, 103, 203).

16 Claims, 6 Drawing Sheets

TORQUE LIMITING COUPLING

CROSS-REFERENCE TO RELATED APPLICATION

This application claims priority to German Patent Application No. 102009037026.9 filed Aug. 13, 2009, which application is herein expressly incorporated by reference.

FIELD AND BACKGROUND

A torque limiting coupling includes a longitudinal axis around which the torque limiting coupling is rotatably arranged. A coupling hub has circumferentially distributed through openings. Drivers are displaceably held parallel to the longitudinal axis in the opening. A coupling sleeve has first recesses corresponding to the through openings. A switching disk is rotatably arranged between a switched-on position and an idling position relative to the coupling hub. In the switched-on position, the drivers engage in the first recesses for torque transmission. When a predetermined torque is exceeded, the switching disk is transferrable from the switched-on position into the idling position by a rolling movement of the drivers. The switching disk has second recesses corresponding to the through openings. The drivers engage, in the idling position, a first spring mechanism that acts on the switching disk in the direction to the switched-on position. A second spring mechanism acts axially on the switching disk and urge the drivers against the coupling sleeve.

Torque limiting couplings are widely known from the state of the art. Forces and/or torque transmitting components of a drive train can be protected very effectively against critical loadings by the torque limiting couplings. Thus, torque limiting couplings can reduce or completely interrupt during an overload of a force- or torque transmission between a drive side and an output side of the drive train.

Document DE 30 34 606 A1 illustrates a torque limiting coupling. Here, when a predetermined torque is exceeded, the driver bodies are pushed axially against the spring force of the spring means out of the recesses and can roll-off on a side face of the coupling sleeve. Thus, the switching disk can rotate into its idling position where the driver bodies engage in recesses of the switching disk. In this position, the coupling hub is separated, drive-wise, from the coupling sleeve. Accordingly, no torque can be transmitted between the coupling hub and the coupling sleeve. Furthermore, the switching disk has, on its outer circumference, a switching cam directed radially outwards. A switching tappet is displaceably arranged between a releasing position and a locking position. The switching tappet interacts with the switching cam in the locking position. Thus, when the torque limiting coupling rotates, the switching disk is transferred into its idling position so that the torque transmission is interrupted. A return cam on the coupling hub moves the switching tappet rotating the switching disk back into the releasing position. A disadvantage of this embodiment is that after switching-off the torque limiting coupling, it is automatically switched-on again at low numbers of revolution as the switching disk is spring loaded to its torque transmitting position. Thus, the torque limiting coupling is also automatically switched-on again in an emergency situation.

Also from the document DE 102 01 988 C2, a torque limiting coupling is known. Here it is possible, when an overload occurs in a drive train with rotating components, to interrupt a force- and/or torque transmission. Further, after removing the overload, an automatic switching-on of the torque limiting coupling at low switching-on number of revolutions occurs. Generally, the switching-on number of revolutions is approximately 100 rpm. If an automatic switching-on of the torque limiting coupling is not desired, it is also possible, at very low number of revolutions, to maintain an emergency-switching-off of the torque limiting coupling. This prevents an automatic switching-on of the torque limiting coupling by means of actuating a corresponding locking pawl.

The emergency switching-off characteristic of the torque limiting coupling described in the document DE 102 01 988 C2 has, however, a disadvantage, that a switching-on of the torque transmission can only be achieved when the coupling is out of operation, namely, such that corresponding pins are manually disengaged.

SUMMARY

Thus, it is object of the present disclosure to provide a torque limiting coupling where the revolution speed for re-switching-on the coupling is variable.

This object is solved by a torque limiting coupling with an actuator that is displaceable from a releasing position to a braking position. The torque limiting coupling interacts, in the braking position, with a braking element such that a braking torque of the braking element is applied to the switching disk.

An advantage of this arrangement is that the braking torque produced by the braking element, with which the first spring mechanism act on the switching disk in a direction of the switched-on position, acts against the spring force. Thus, the torque, acting on the switching disk by the braking element, urges the switching disk to its idling position. Thus, by a suitable conception of the braking element, the torque limiting coupling can be held by the actuator and the braking element against the spring force of the first spring means in the idling position.

The complete shut-down of a torque limiting coupling, via a braking element described here, starts from a coupling in rotating or torque transmitting condition. Thus, the braking element, held by the actuator against rotation, produces a torque on the switching disk that can also be designated as braking torque.

In a first embodiment, the braking torque produced by the braking element exceeds the spring force of the first spring mechanism so that the braking torque holds the switching disk in the idling position against the first spring mechanism. Accordingly, the switching disk, which was transferred from the switched-on position into the idling position, is also securely held in the idling position during the reduction of the number of revolution of the torque coupling. In this case, the braking position of the actuator can be maintained so long, until the number of revolutions of the torque limiting coupling has dropped to the desired number of revolutions. Thus, it is possible, by transferring the actuator into the released position, to switch-on the coupling automatically, while the torque limiting coupling is still rotating. Thus, the user does not have to wait until the number of revolutions of the coupling has dropped to zero.

The braking element is freely rotatable relative to the switching disk in the released position of the actuator. The braking element is provided on one or both sides with friction linings. The friction linings provide the friction contact to the switching disk. Because of the rotatability of the braking element relative to the switching disk, it is ensured, that a relative number of revolutions can result between the two.

The braking element is locked by the actuator. Thus, a braking torque can act on the switching disk due to the friction contact.

The actuator interacts with one switching face of the braking element. For example, the actuator engages, in the braking position, behind the switching face of the braking element. Thus, the braking element is retained when the switching disk rotates relative to it. Thus, in the braking position of the actuator, the braking element acts on the switching disk with a braking torque. Advantageously, the braking element has several teeth distributed along its circumference. Each tooth has, in one circumferential direction, one radially directed switching face and, in the other circumferential direction, a ramp-like abutting face. Thus, this ensures that, when rotating the torque limiting coupling in the one rotational direction, the actuator interacts with the radially directed switching faces of the braking element. In the other rotational direction, the actuator slides along the ramp-like abutting faces. The braking element can also rotate when the actuator is in the braking position.

Preferably, the actuator is transferrable into a locking position where it interacts with the switching disk. Thus, the switching disk is transferable from the switched-on position to the idling position. The locking position is a position of the actuator that the actuator gets into when it is moved starting from the released position, beyond the braking position. Preferably, the actuator interacts with one radially extending switching face of the switching disk. The actuator interacts, in the locking position in the same manner as in the braking position, with the braking element.

The switching-off torque for moving the switching disk into the idling position is distinctly higher than the holding torque for holding the switching disk in the idling position. Thus, the necessary increased switching-off torque is achieved by a form-fitting engagement of the actuator with the switching disk. However, the braking element and the friction linings only have to be dimensioned for the holding torque. Thus, the braking element and friction linings hold the switching disk that was transferred by the actuator into the idling position, against the force of the first spring means. The switching disk has several switching cams along its circumference that have, in the one circumferential direction, radially aligned switching faces and, in the other circumferential direction, ramp-like abutting faces.

The actuator interacts, in the locking position, by rotating the coupling hub so that the actuator is transferable into the braking position. The actuator interacts with a ramp-like abutting face of the coupling hub. The actuator interacts in the braking position with the braking element so that the braking element is held against rotation. The switching disk is held against rotation, in the idling position, by the braking element, but otherwise it is not prevented by the actuator to rotate further. The actuator is positioned in the braking position outside of the rotational radius of the switching disk.

In the first embodiment, a third spring mechanism is provided. The third spring mechanism urges the braking element, at least indirectly, axially against the switching disk. In this case, the third spring mechanism includes compression springs. The compression springs are distributedly arranged along the circumference. The third spring mechanisms are supported at their side facing away from the switching disk on a clamping disk. The third spring mechanism and the clamping plate are rotationally fixedly connected, at least indirectly, to the switching disk. Thus, a compact construction and an exceptionally constant loading of the braking element against the switching disk are achieved by the circumferential arrangement of the third spring mechanism.

The actuator is formed as a locking pawl. The locking pawl is pivotable around a pivot axis between a released position and the locking position. The pivot axis is arranged parallel and off-set to the longitudinal axis of the torque limiting coupling.

The braking element includes a brake disk. This provides a simple construction that enables the friction linings to be deposited in a commercially available way in the same manner as on a clutch disk.

In a variant of the first embodiment, the actuator, the braking disk and the third spring mechanism are dimensioned so that the switching disk is transferable from the switched-on position to the idling position by the braking torque acting on the switching disk. In this case, no form-fitting engagement of the actuator in the switching disk is necessary.

In a second embodiment, the braking torque produced by the braking element exceeds the spring force of the first spring mechanism and the friction between the drivers and the switching disk so that the braking torque transfers the switching disk from the switched-on position into the idling position against the first spring mechanism and the friction between the drivers and the switching disk. During this release, no relative rotation takes place between the coupling sleeve and the coupling hub because of excess torque, no rolling-off movement of the drivers in the first recesses of the coupling sleeve takes place that produces a rolling-off of the drivers on the switching disk. If no excess torque occurs, the switching disk can only be transferred into the idling position when the drivers slide-off on it. The braking torque necessary for exceeding this friction and the first spring mechanism is produced by the braking element according to the second embodiment. Thus, the second embodiment has an emergency-stop-function that can be used at the same time because of the dimensioning of the actuator and of the braking element, to decelerate lagging masses, such as the working implement driven via the torque limiting coupling.

The braking element is wrapped around a circumference of the switching disk. The braking element is held, in a rotationally fixed manner, in the released position of the actuator relative to the switching disk.

Thus, a simple and robust construction of the braking device is achieved. As the braking element is wrapped around the switching disk, it can easily be exchanged for a new braking element when it exceeds the wear limit. Thus, without that, the torque limiting coupling has to be disassembled beside a housing. The braking element does not rotate in the locking position as well as in the releasing position. Thus a bearing does not need to be provided for rotation.

One end of the braking element is displaceable relative to the switching disk in at least one direction. In this case, the displacement direction extends approximately tangential to the switching disk. The actuator engages the displaceable end of the braking element.

Thus, the braking element can be attached with one of its ends on a component that is stationary relative to the torque limiting coupling. The braking element can be closed via the other end of the braking element along the circumference of the switching disk into a locking position. Thus, a friction contact is produced between the braking element and the switching disk.

The actuator includes an electrically controlled and pivotably arranged brake lever. In this case, the brake lever is stationarily held, however, pivotable on a center portion. The one end of the brake lever is connected to the displaceable end of the braking element. The other end of the brake lever is connected to an electrically controlled adjustment element. The brake lever is aligned in the basic position approximately at a right angle to the displaceable end of the braking element that extends approximately tangential to the switching disk.

In the second embodiments, the braking element includes a braking band.

In a variant of the second embodiment, a radial outer portion of the switching disk is formed as a brake disk. A brake calliper is provided as an actuator. The calliper engages around the brake disk and acts on it with a braking torque. Also, in this case, the to be produced braking torque is dimensioned so that the switching disk is transferable from the switched-on position to the idling position and no form-fitting engagement of the actuator in the switching disk is necessary.

Further areas of applicability will become apparent from the description provided herein. The description and specific examples in this summary are intended for purposes of illustration only and are not intended to limit the scope of the present disclosure.

DRAWINGS

Preferred embodiments are described in more detail using the following drawings. It shows:

DETAILED DESCRIPTION

Figure 1:
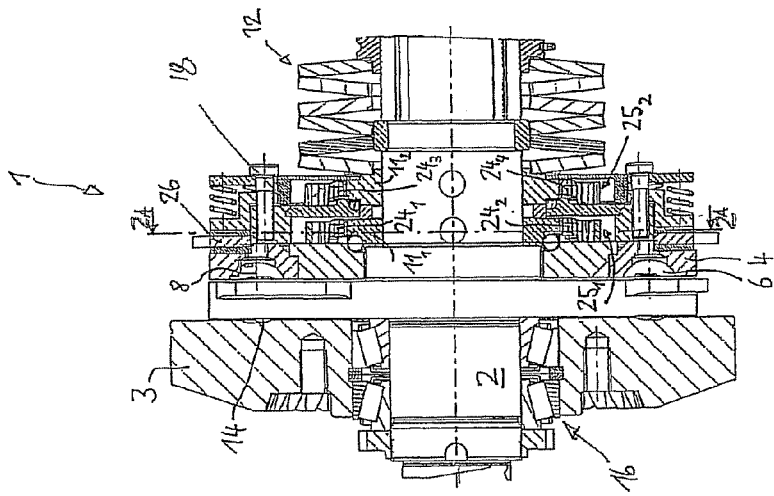
FIG. 1(a) is a longitudinal sectional view in a switched-on position of a torque limiting coupling according to a first embodiment.
FIG. 1(b) is a longitudinal sectional view like FIG. 1(a) in an idling position.
Figure 1:
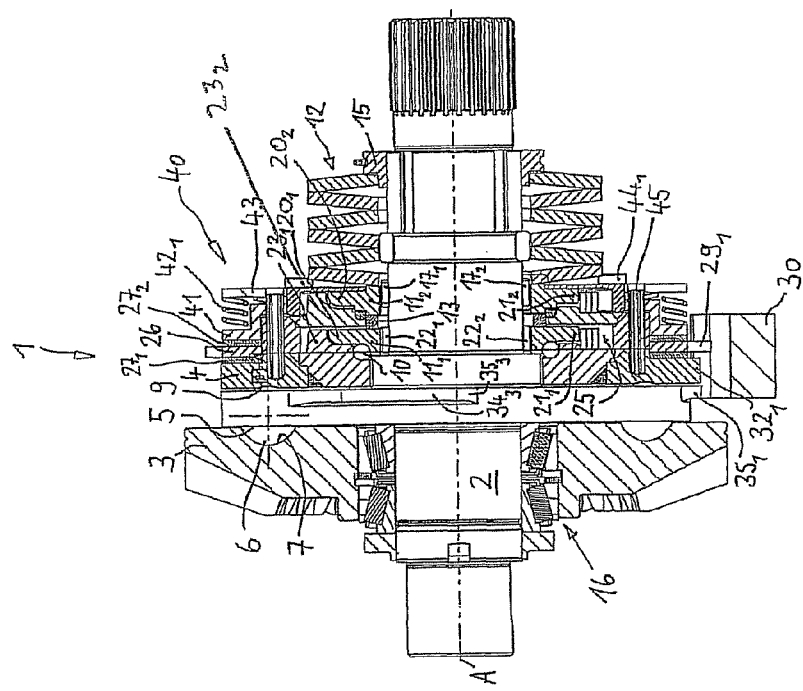
Figure 2:
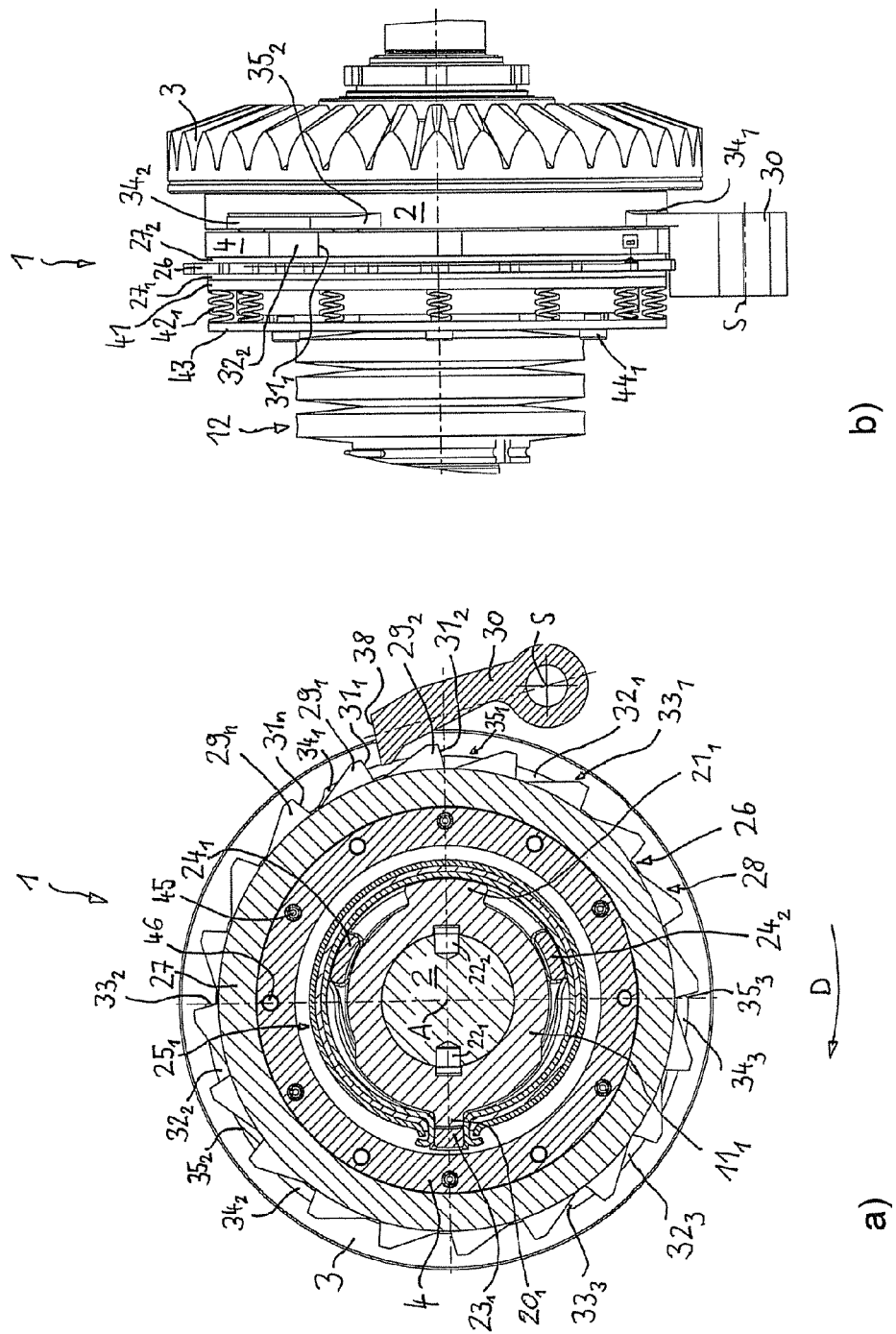
FIG. 2(a) is a cross-sectional view along the intersection line 2A-2A of FIG. 1(b) of the torque limiting coupling.
FIG. 2(b) is a side elevation view of the torque limiting coupling.
Figure 3:
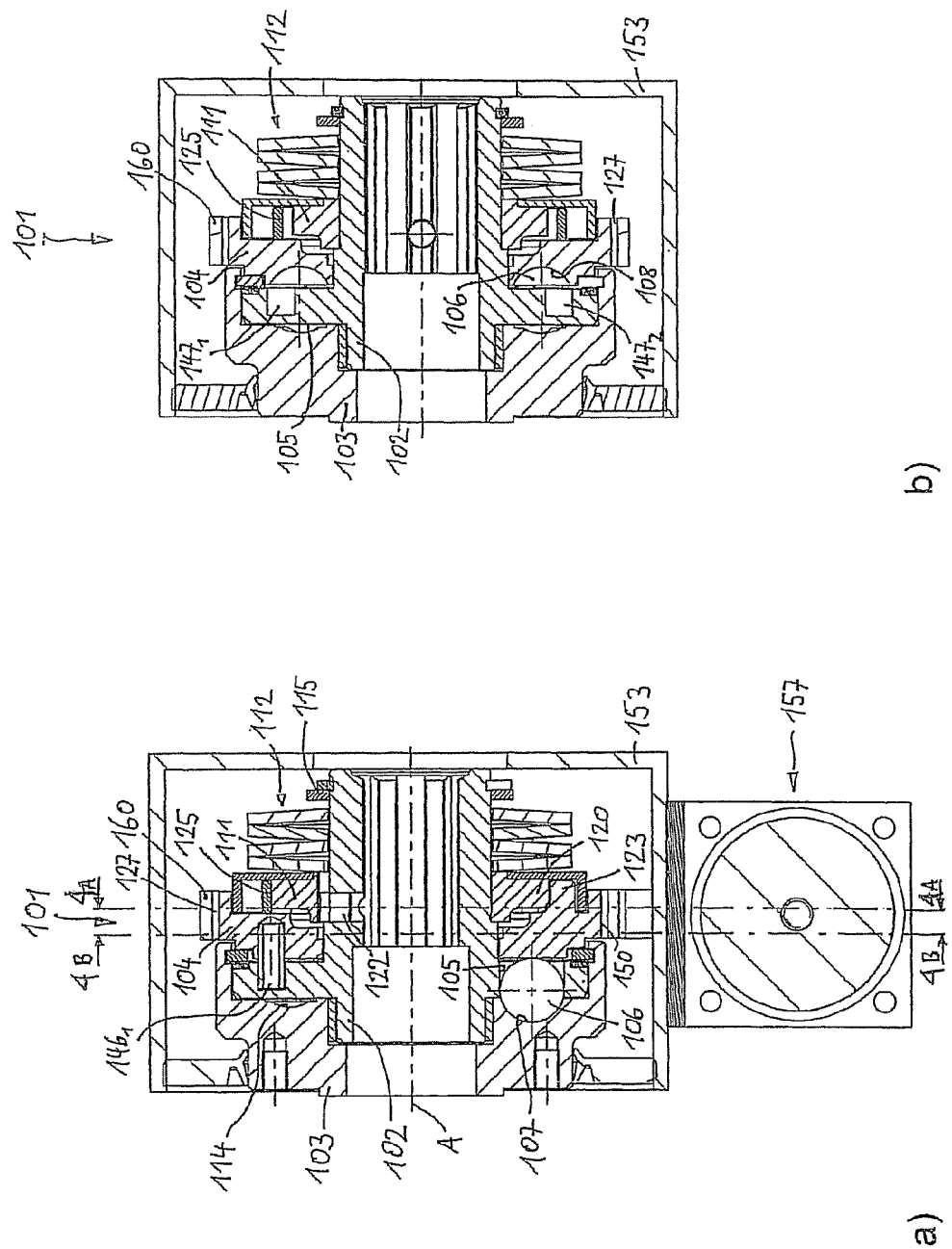
FIG. 3(a) is a longitudinal sectional view in a switched-on position of a torque limiting coupling according to a second embodiment.
FIG. 3(b) is a longitudinal sectional view like FIG. 3(a) in an idling position.
Figure 4:
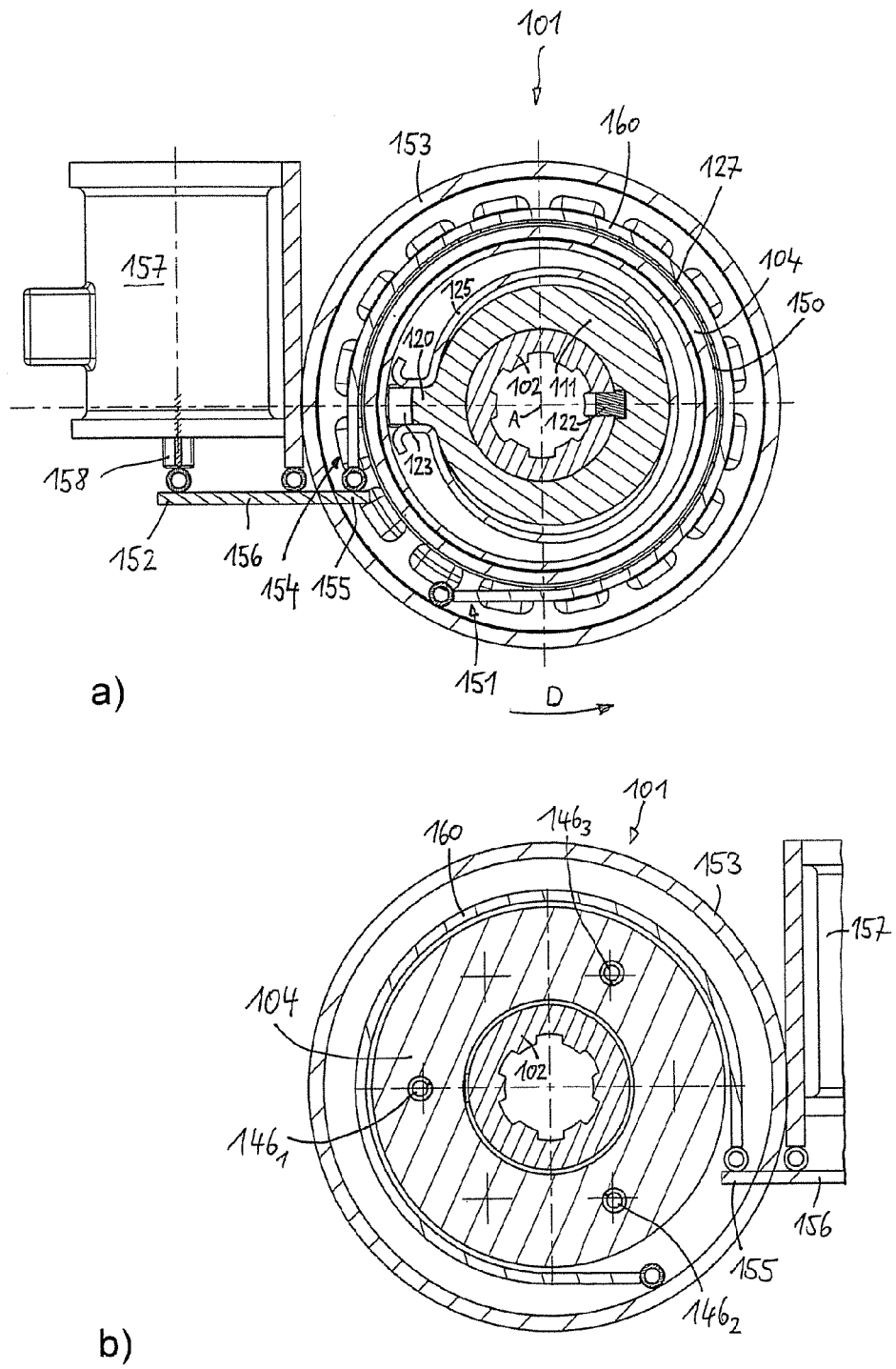
FIG. 4(a) is a cross-sectional view along the intersection line 4A-4A of FIG. 3a of the torque limiting coupling.
FIG. 4(b) is a cross-sectional view along the intersection line 4B-4B of FIG. 3a of the torque limiting coupling.

A preferred embodiment of the present disclosure will be described with reference to the accompanying drawings.

FIGS. 1a to 2b show a first embodiment of a torque limiting coupling 1 and are initially described together. The torque limiting coupling 1 is rotatably arranged around a longitudinal axis A. The coupling includes a coupling hub 2, a coupling sleeve 3 as well as a switching disk 4. As shown, the coupling sleeve 3 can, for example, be formed as a ring gear. The coupling hub 2 has circumferentially distributed through openings 5. Drivers 6, operating as rolling members, are displaceably held parallel to the longitudinal axis A in the openings 5. The coupling sleeve 3 has first recesses 7, corresponding to the through openings 5. The switching disk 4 has second recesses 8, corresponding to the through openings 5. The switching disk 4 is rotatably arranged relative to the coupling hub 2 between a switched-on position (FIG. 1a) and an idling position (FIG. 1b). In the switched-on position, respectively coupling-in position of the switching disk 4, the drivers 6 project in the direction towards the coupling sleeve 3 from the through openings 5 and engage in the first recesses 7. On the side facing away from the coupling sleeve 3, the drivers 6 also project from the through openings 5 and are axially supported on bearing grooves 9. The bearing grooves 9 are arranged in a circumferential direction extending between the second recesses 8 of the switching disk 4. In the switched-on position, the first recesses 7 of the coupling sleeve 3 and the second recesses 8 of the switching disk 4 are arranged off-set to each other concerning their rotational position.

The switching disk 4 is supported via a thrust bearing 10 against a series arrangement. The thrust bearing 10 includes a first thrust ring $11_1$, a distancing ring 13 and a second thrust ring $11_2$, axially on a second spring mechanism, here in the form of a disk spring assembly 12. The thrust rings $11_1$, $11_2$ are axially displaceable and rotationally fixed, via featherkeys $22_1$, $22_2$, $17_1$, $17_2$, on the coupling hub 2. The disk spring assembly 12 is pre-biased and acts indirectly on the switching disk 4 with a force in an axially direction. The disk spring assembly 12 is supported on a support ring 15 that is fast connected to the coupling hub 2. The drivers 6 are held in the first recesses 7 by this pre-biased arrangement.

Exceeding a limiting torque, pre-adjusted by the above described axial pre-biasing, results in a relative rotation of coupling sleeve 3 and coupling hub 2. The drivers 6 roll into the first recesses 7 of the coupling sleeve 3 and push against the spring force of the disk spring assembly 12. Thus, the disk spring assembly 12 is compressed by an axial movement of the switching disk 4 in direction towards the disk spring assembly 12. The drivers 6 roll into the first bearing grooves 9 of the switching disk 4 as well as into the second bearing grooves 14 of the coupling sleeve 3. Due to the rolling-off movement of the drivers 6, the switching disk 4 is rotated relative to the coupling hub 2 around the longitudinal axis A. In the idling position of the switching disk 4, the drivers 6 engage in the second recesses 8. The switching disk 4 is moved axially because of the spring force of the disk spring assembly 12 in a direction towards the coupling sleeve 3. In this idling position, the torque transmission between the coupling sleeve 3 and the coupling hub 2 is interrupted. Thus, the coupling sleeve 3 can freely rotate, via a rolling member bearing arrangement 16, relative to the coupling hub 2, and the drivers 6 roll in the second bearing grooves 14.

In FIG. 2a, a cross-sectional view of the torque limiting coupling 1 is shown in the switched-on position. The coupling hub 2, the thrust ring $11_1$, the switching disk 4, first spring mechanism, a friction lining $27_1$ and ring gear 28 are concentrically held to each other on the circumference of the braking disk 26. The thrust ring $11_1$ has radial projections $20_1$, $21_1$ and is held, via two featherkeys $22_1$, $22_2$, in a rotationally fixed and axially displaceable manner on the coupling hub 2. The switching disk 4 has axial projections $23_1$, $24_1$, $24_2$. The first spring mechanism is in the form of a tensioning clamp assembly $25_1$. The ring gear 28 includes a multitude of teeth $29_1$, $29_2$, $29_n$, wherein the number n of teeth $29_1$, $29_2$, $29_n$, can vary depending upon the application of the torque limiting coupling 1. Each tooth $29_1$, $29_2$, $29_n$ has a radially extending switching face $31_1$, $31_2$, $31_n$. Behind the ring gear 28, partially covered by it, switching cams $32_1$, $32_2$, $32_n$ with radially extending switching faces $33_1$, $33_2$, $33_n$ are visible on the circumference of the switching disk 4. Control cams $34_1$, $34_2$, $34_n$ are visible with ramp-like abutting faces $35_1$, $35_2$, $35_n$ on the circumference of the coupling hub 2.

As seen in FIGS. 1(a) and 1(b), the axial projections $23_1$, $24_1$, $24_2$ of the switching disk 4 engage radially around the thrust ring $11_1$. The tensioning clamp assembly $25_1$ is radially guided by the axial projections $24_1$, $24_2$ and is supported in a circumferential direction on the radial projection $20_1$ of the thrust ring $11_1$ as well as on the axial projection $23_1$ of the switching disk 4. Thus, the tensioning clamp assembly $25_1$ acts on the switching disk 4 to take-up its switched-on position, as shown in FIG. 2a. In the idling position, not shown in a cross-sectional view, the switching disk 4 is rotated against the thrust ring $11_1$ in a circumferential direction. One of its axial projections $24_1$, $24_2$ abuts the radial projection 21 of the thrust ring $11_1$. Thus, a further rotation is not possible. During every rotational position of the switching disk 4 and of the thrust ring $11_1$ relative to each other, the tensioning clamp assembly $25_1$ produces a return torque in a direction of the switched-on position, shown in FIG. 2a, which, thus, can be designated as the basic position.

In FIGS. 1a und 1b a further arrangement is shown that produces a further return torque onto the switching disk 4. The arrangement includes an intermediate disk 18, a second tensioning clamp assembly $25_2$ and thrust ring $11_2$. The intermediate disk 18 is connected in a rotationally fixed manner to the switching disk 4 and has axial projections $23_2$, $24_3$, $24_4$. The thrust ring $11_2$ has radial projections $20_2$, $21_2$. The arrangement and the engagement of the components in each other are analogous to the arrangement that includes the thrust ring $11_1$ and the tensioning clamp assembly $25_1$.

In FIGS. 1a, 2a and 2b a locking pawl 30 is shown. The locking pawl 30 is pivotably held around a pivot axis S. The pawl 30 extends off-set and parallel to the axis of rotation A on a carrier (not shown) between a releasing position and a locking position. The pivoting is carried out by a device not described in detail that can, for example, be hydraulically or pneumatically actuated. The locking pawl 30 is pivoted into a braking position engaging between two teeth $29_1$, $29_2$ of the ring gear 28 and abutting a control cam $34_1$ of the coupling hub 2. In the following the interaction of the locking pawl 30 with the torque limiting coupling 1 and the different shifting positions are described. It starts from a continuous rotation in rotational direction D of the coupling 1.

An abutment face 38 of the locking pawl 30 abuts the switching face $31_1$ of the braking disk 26 and holds it against rotation. Subsequently, the control cam $34_1$ rotates away under the locking pawl 30, so that it can be transferred, by further rotating, into the locking position. In the locking position, the abutment face 38 of the locking pawl 30 abuts the switching face $33_2$ of the switching disk 4 and holds it back against rotation, also against the rotating coupling hub 2, so that the switching disk 4 is transferred into its idling position. In this position the first recesses 7, the through openings 5 and the second recesses 8 are axially aligned with each other. Thus, the drivers 6 can move from the first recesses 7 into the second recesses 8. Then, the locking pawl 30 is transferred by the control cam $34_2$ of the rotating coupling hub 2 again into the braking position, in which it abuts the switching face $31_1$ of the braking disk 26 and holds it back against rotation.

The braking disk 26 is part of a braking arrangement 40 that is seen from FIGS. 1a, 1b and partially FIG. 2b. The braking arrangement 40 further includes friction linings $27_1$, $27_2$, a pressure plate 41, a multitude of circumferentially distributed compression springs $42_1$, $42_2$, $42_n$, a clamping plate 43, a multitude of circumferentially distributed bolts $44_1$, $44_2$, $44_n$ and pins $45_1$, $45_2$, $45_n$. The pressure plate 41 and the clamping plate 43 are held by the bolts $44_1$, $44_2$, $44_n$ and the pins $45_1$, $45_2$, $45_n$ on the side facing away from the second recesses 8 of the switching disk 4. The pressure plate 41 is axially displaceable relative to the switching disk 4. The compression springs $42_i$, $42_2$, $42_n$ are held parallel to the longitudinal axis A between the pressure plate 41 and the clamping plate 43 under pre-biasing. The compression springs $42_1$, $42_2$, $42_n$ act on the pressure plate 41 in a direction of the switching disk 4. The braking disk 26 with the friction linings $27_1$, $27_2$, arranged on both sides of the braking disk 26, is guided between the pressure plate 41 and the switching disk 4. The braking disk 26 is held in friction control with the switching disk 4 by this axial force loading of the braking arrangement 40.

If the switching disk 4, as described above, is transferred by the interaction with the locking pawl 30 into its idling position and if the locking pawl 30 is in the braking position where it holds back the braking disk 26 against rotation, then the braking disk 26 applies, because of the friction contact, a braking torque onto the switching disk 4. This braking torque in the present embodiment of the torque limiting coupling 1 is dimensioned so that it holds the switching disk 4 that is urged by the tensioning clamping assembly 25 in a direction to its switched-on position, against the torque of the tensioning clamp assembly 25 in the idling position. The switching disk 4 is held in the idling position when the relative number of revolutions between the coupling sleeve 3 and the coupling hub 2 is reduced.

FIGS. 3a to 4b show a second embodiment of a torque limiting coupling 101 and are described initially together. The basic function concerning the torque limitation of the coupling 101 corresponds to that described in the first embodiment according to the preceding figures. In the following, the differences between the first embodiment are described and the same or corresponding components are provided with reference numerals that are increased by the numerical value 100.

The switching disk 104 is supported via a thrust bearing 110 against a thrust ring 111 axially on second spring mechanism, for example, in form of a disk spring assembly 112. The disk spring assembly 112 is pre-biased and thus indirectly loads the switching disk 104 in an axial direction with a load. Via this pre-biased arrangement, the drivers 106 are held in the first recesses 107.

The relative rotation between the switching disk 104 and the coupling hub 102, during the change from the switched-on position to the idling position, is limited by three locking pins $146_1$, $146_2$, $146_3$. The locking pins $146_1$, $146_2$, $146_3$ are fixed parallel to the longitudinal axis A on a circumference on the switching disk 104, as seen in FIGS. 3a and 4b. Each locking pin $146_1$, $146_2$, $146_3$ engages, respectively, in a groove $147_1$, $147_2$, $147_3$ arranged on the circumference of the coupling hub 102.

In FIG. 4a the torque limiting coupling 101 is shown in a cross-sectional view in the switched-on position. The thrusting ring 111, switching disk 104, first spring mechanism and a friction lining 127 are arranged concentrically to each other. The thrust ring 111 has a radial projection 120. The thrust ring 111 is held, in a rotationally fixed manner, by a featherkey 122. The thrust ring 111 is axially displaceable on the coupling hub 102. The switching disk 104 has an axial projection 123. The first spring mechanism is in the form of a tensioning clamp 125. The tensioning clamp 125 is radially guided by the thrust ring 111 in the area of the radial projection 120 and on a circumferential area opposite to the projection 120. The tensioning clamp 125 is supported in a circumferential direction on the radial projection 120 of the thrust ring 111 as well as on the axial projection 123 of the switching disk 104. Thus, the tensioning clamp 125 acts on the switching disk 104 to take-up its switched-on position, as shown in FIG. 4a. In the switched-on position, the locking pins $146_1$, $146_2$, $146_3$ are arranged in the grooves $147_1$, $147_2$, $147_3$ of the switching disk 104 in the one circumferential direction. In the idling position, not shown in a cross-sectional view, the switching disk 104 is rotated against the thrust ring 111 so far in circumferential direction, that the locking pins $146_1$, $146_2$, $146_3$ are supported in the grooves $147_1$, $147_2$, $147_3$ of the switching disk 104 in the opposite circumferential direction. Thus, a further rotation is not possible. In the idling position, the coupling sleeve 103 can freely rotate, via a not shown bearing arrangement, relative to the coupling hub 102.

Furthermore, in FIGS. 3a to 4b, a braking band 160 is shown. The braking band 160 wraps around a circumference 150 of the switching disk 104 that includes a friction lining 127 that is arranged approximately around three fourth of the switching disk. The one end 151 of the braking band 160 is connected to a coupling housing 153 that is rotationally fixed relative to the coupling 101. The other end 154 of the braking band 160 is connected to the one end 155 of a brake lever 156. The one end 155 of the brake lever 156 is pivotably held in a center portion relative to the coupling housing 153. The other end 152 of the brake lever 156 is connected to an adjustment element 158, movable by an electric motor 157. The end 154 of the braking band 160 extends approximately tangential to the switching disk 104. The adjustment element 158 and its adjustment direction extend parallel thereto. By adjusting the adjustment element 158, the braking band 160 is clamped by the brake lever 156, pivotably supported via the coupling housing 153, depending on the adjustment direction stronger or weaker across the friction lining 127 on the circumference 150 of the switching disk 104. A full extension of the adjustment element can completely or nearly completely lift the braking band 160 from the friction lining 127 of the switching disk, so that none or nearly no friction contact exists.

The braking band 160, which is held against rotation and is clamped onto the switching disk 104, provides a continuously adjustable braking torque that can act on the switching disk 104. If the braking torque exceeds a specific threshold torque, the switching disk 104 is held back relative to the coupling hub 102 and is transferred into the idling position. The threshold torque is determined by the counter torque of the tensioning clamp 125 and the counter torque due to the static friction of the drivers 106 in the bearing grooves 109 of the switching disk 104. As already described above, in the idling position the torque transmission between the coupling sleeve 103 and the coupling hub 102 is interrupted. An advantage of the second embodiment of the torque limiting coupling 101 is that the braking band 160 and the actuation by the brake lever 156 are dimensioned such that the lagging masses, in form of the working implement, can be decelerated securely until the shutdown.

Figure 5:
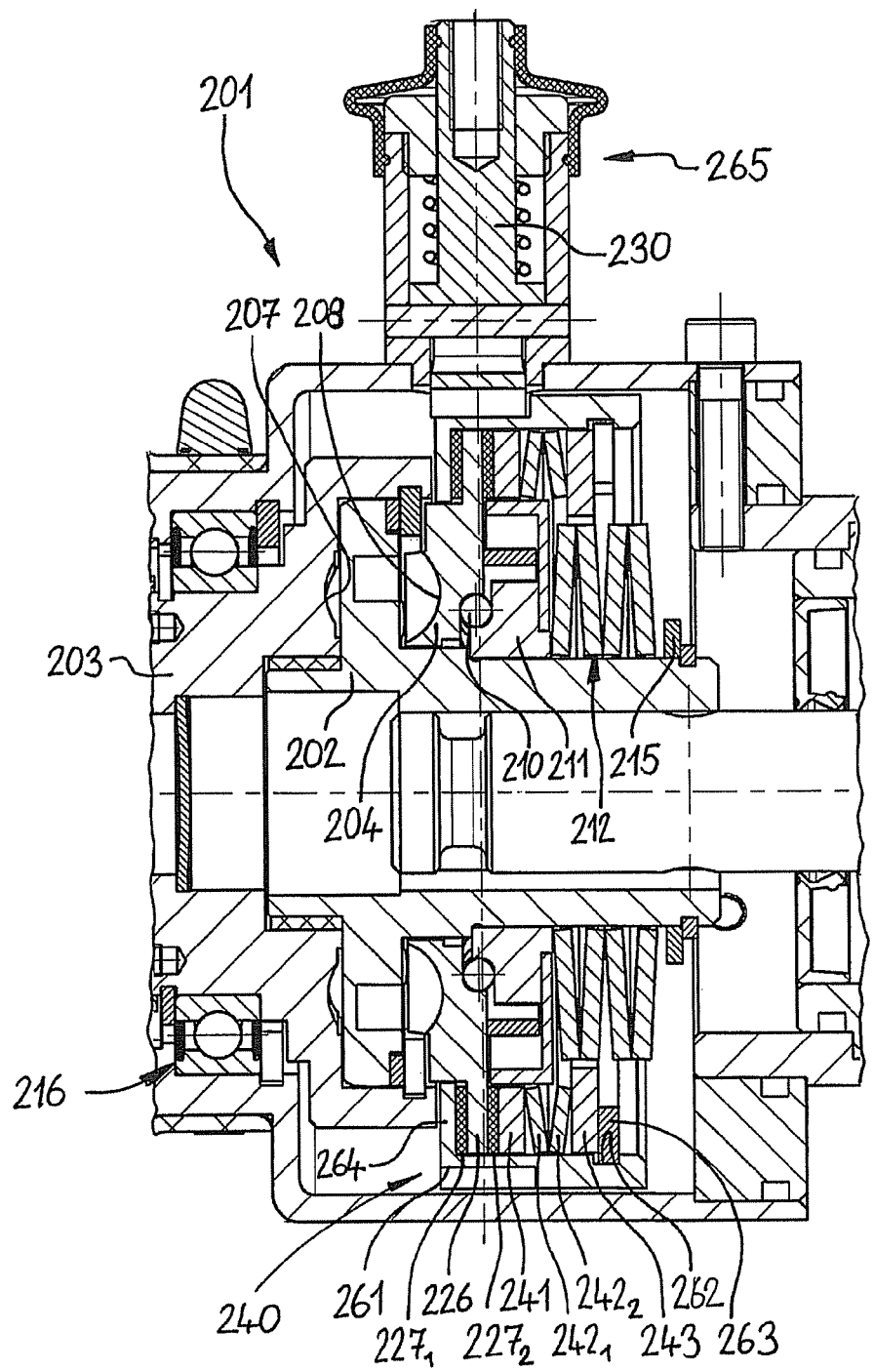
FIG. 5(a) is a longitudinal sectional view of a torque limiting coupling according to a third embodiment.
FIG. 5(b) is a cross-sectional view of FIG. 5(a).
Figure 5:
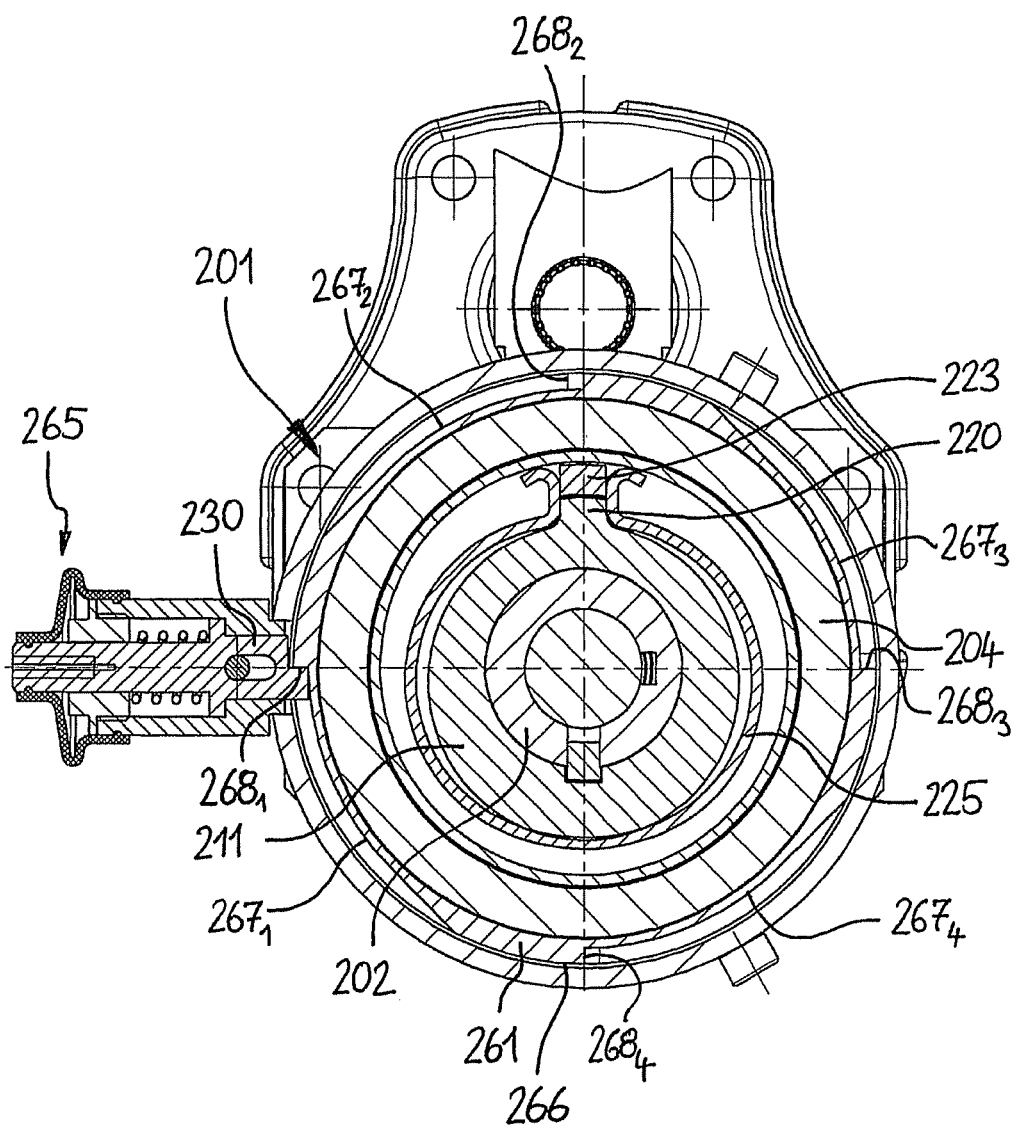

FIGS. 5a and 5b show a third embodiment of a torque limiting coupling according to the disclosure in different views and are described in the following together. The function corresponds to that of the second embodiment. The arrangement is comparable to that of the first embodiment. Components that correspond to components of the first embodiment are provided with reference numerals that are increased by the numerical value 200. In the following, primarily the difference of the third embodiment to those of the first two embodiments is described. Furthermore, it is referred to the description of the first embodiment.

The switching disk 204 is integrally formed with a braking disk 226 that projects radially annularly from the switching disk 204. The braking disk 226 can, however, also be formed as a separate component and can be connected to the switching disk 204. The braking disk 226 can be decelerated by the braking arrangement 240. The braking arrangement 240 includes two annular friction linings $227_1$, $227_2$, an annular pressure plate 241, a multitude of compression springs $242_1$, $242_2$ in form of disk springs, a clamping plate 243 as well as a brake housing 261.

The brake housing 261 is formed with a cup-like appearance and encloses the braking disk 226. The brake housing 261 has an annular portion 264. The annular portion 264 projects radially inwards from the brake housing 261 and is arranged axially overlapping the brake disk 226. One of the friction linings $227_1$ is arranged between the braking disk 226 and the annular portion 264. The pressure plate 241 is arranged on the side of the braking disk 226 facing away from the annular portion 264. A further friction lining $227_2$, is arranged between the pressure plate 241 and the braking disk 226.

A disk spring assembly is arranged on the side of the pressure plate 241 facing away from the braking disk 226. The disk spring assembly includes compression springs $242_1$, $242_2$ in the form of disk springs and is axially supported on the clamping plate 243. The clamping plate 243 is itself axially supported on a securing ring 263. The securing ring 263 rests in a securing groove 262 of the brake housing 261.

In this case, the compression springs $242_1$, $242_2$ are pre-biased. Thus, the braking disk 226 is pre-biased with a pre-determined force between the annular portion 264 and the pressure plate 241. Thus, during normal operation, the brake arrangement 240 rotates with the switching disk 204.

The brake housing 261 has four retaining recesses $267_1$, $267_2$, $267_3$, $267_4$ on an outer circumferential face 266. The retaining recesses $267_1$, $267_2$, $267_3$, $267_4$ extend, respectively, across a portion of the circumference. The retaining recesses $267_1$, $267_2$, $267_3$, $267_4$ form, respectively, a retaining face $268_1$, $268_2$, $268_3$, $268_4$ that extends radially. The locking pawl 230 is, in the present case, a movable radially translator 265 and engages in a locking position in one of the retaining recesses $267_1$. The locking pawl 230 is supported in a circumferential direction on the corresponding retaining face $268_1$ so that the brake housing 261 is supported against rotation. In this case, a relative movement occurs between the brake housing 261 and the braking disk 226 of the switching disk 204. Thus, via the friction linings $227_1$, $227_2$, a friction force acts on the braking disk 226 and on the switching disk 204. Accordingly, the switching disk 204 is initially transferred into the idling position. Then, the whole torque limiting coupling is decelerated by the braking arrangement 240 and the braking disk 226, so that the lagging masses are decelerated.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A torque limiting coupling rotatably arranged around a longitudinal axis comprising:
    a coupling hub with circumferentially distributed through openings;
    drivers are displaceably held parallel to the longitudinal axis in the openings;
    a coupling sleeve has first recesses corresponding to the through openings;
    a switching disk is rotatably arranged between a switched-on position and an idling position relative to the coupling hub, in the switched-on position, the drivers engage in the first recesses for torque transmission, and when the switching disk exceeds a predetermined torque, the switching disk is transferred from the switched-on position into the idling position by a rolling movement of the drivers, the switching disk has second recesses corresponding to the through openings and the drivers engage the second recesses in the idling position;
    a first spring mechanism urges the switching disk in a direction towards the switched-on position;

a second spring mechanism acts axially on the switching disk and urges the drivers against the coupling sleeve;

an actuator moves between a releasing position and a braking position, and in the braking position, the actuator interacts with a braking element which is in frictional contact with the switching disk such that during relative movement between the braking element and the switching disk a braking torque is applied from the braking element to the switching disk by a friction force between the braking element and the switching disk.

2. The torque limiting coupling according to claim 1, wherein the braking element is rotatable in the releasing position of the actuator relative to the switching disk.

3. The torque limiting coupling according to one of claim 1, wherein the actuator is displaceable into a locking position, in the locking position, the actuator interacts with the switching disk such that the switching disk is transferred from the switched-on position to the idling position.

4. The torque limiting coupling according to claim 3, wherein in the locking position of the actuator, the actuator interacts with the coupling hub by rotating the coupling hub such that the actuator is transferable into the braking position.

5. The torque limiting coupling of claim 1, wherein in the braking position and in the locking position the actuator interacts with the braking element such that the braking element is retained against rotation.

6. The torque limiting coupling according to claim 1, wherein a third spring mechanism axially urges the braking element, at least indirectly, against the switching disk.

7. The torque limiting coupling according to claim 6, wherein the third spring mechanism includes compression springs that are arranged along a circumference of the braking element.

8. The torque limiting coupling according to claim 6, wherein the third spring mechanism is supported on its side facing away from the switching disk on a clamping plate, wherein the third spring mechanism and the clamping plate are at least indirectly connected, in a rotationally fixed manner, to the switching disk.

9. The torque limiting coupling according to claim 1, wherein the actuator is a locking pawl.

10. The torque limiting coupling according to claim 1, wherein the braking element includes a braking disk.

11. The torque limiting coupling according to claim 1, wherein the braking element encompasses a circumference of the switching disk and the braking element includes a braking band.

12. The torque limiting coupling according to claim 11, wherein the braking element is held by the actuator in a rotationally fixed manner relative to the switching disk.

13. The torque limiting coupling according to claim 11, wherein one end of the braking element is displaceable relative to the switching disk at least in a predominantly tangential direction.

14. The torque limiting coupling according to claim 13, wherein the actuator engages on the displaceable end of the braking element.

15. The torque limiting coupling according to claim 11, wherein the actuator further comprises an electrically controlled and pivotably arranged brake lever.

16. The torque limiting coupling according to claim 1, wherein the actuator further comprises an electrically controlled and pivotably arranged brake lever.

\* \* \* \* \*

UNITED STATES PATENT AND TRADEMARK OFFICE
CERTIFICATE OF CORRECTION

PATENT NO. : 8,668,065 B2  
APPLICATION NO. : 12/854991  
DATED : March 11, 2014  
INVENTOR(S) : Klaus Kämpf et al.

Page 1 of 1

It is certified that error appears in the above-identified patent and that said Letters Patent is hereby corrected as shown below:

In the Specification

Column 7
Line 6    "radial projection 21" should be --radial projection $21_1$--
Line 63   "compression springs $41_i$, $42_2$, $42_n$" should be --compression springs $42_1$, $42_2$, $42_n$--

Signed and Sealed this  
Fifth Day of August, 2014

Michelle K. Lee  
*Deputy Director of the United States Patent and Trademark Office*